United States Patent
Pizzato (10) Patent No.: US 12,556,125 B2
(45) Date of Patent: Feb. 17, 2026

(54) SAFETY DEVICE, SYSTEM AND METHOD FOR MONITORING AN ELECTRIC MOTOR

(71) Applicant: PIZZATO ELETTRICA S.R.L., Marostica (IT)

(72) Inventor: Giuseppe Pizzato, Marostica (IT)

(73) Assignee: PIZZATO ELETTRICA S.R.L., Marostica (IT)

( * ) Notice: Subject to any disclaimer, the term of this patent is extended or adjusted under 35 U.S.C. 154(b) by 163 days.

(21) Appl. No.: 18/437,478

(22) Filed: Feb. 9, 2024

(65) Prior Publication Data

US 2024/0275326 A1    Aug. 15, 2024

(30) Foreign Application Priority Data

Feb. 10, 2023   (IT) .................. 102023000002340

(51) Int. Cl.
*H02P 29/032*   (2016.01)
*H02H 7/08*   (2006.01)
*H02P 29/024*   (2016.01)

(52) U.S. Cl.
CPC ......... *H02P 29/032* (2016.02); *H02H 7/0844* (2013.01); *H02P 29/024* (2013.01)

(58) Field of Classification Search
CPC ...... H02P 29/032; H02P 29/024; H02P 29/10; H02H 7/0844; H02H 7/085; H02H 7/08; G01R 31/34; G01R 19/0084; G01R 19/16576; G01R 23/005; G01R 23/02; H02K 11/20; H02K 11/30
USPC ................. 318/400.2, 400.01, 700
See application file for complete search history.

(56) References Cited

U.S. PATENT DOCUMENTS

| | | | | |
|---|---|---|---|---|
| 5,767,639 A | * | 6/1998 | Sakaguchi | G11B 19/28 318/400.11 |
| 6,049,284 A | * | 4/2000 | Heuer | F16P 3/08 318/671 |
| 7,528,612 B2 | * | 5/2009 | Gollhardt | H02B 13/025 324/501 |
| 11,260,740 B2 | * | 3/2022 | Kanda | F02N 11/0818 |
| 2015/0346739 A1 | | 12/2015 | Swanson et al. | |
| 2018/0076753 A1 | | 3/2018 | Donolo et al. | |

FOREIGN PATENT DOCUMENTS

EP   3731408 A1   10/2020

* cited by examiner

*Primary Examiner* — David Luo
(74) *Attorney, Agent, or Firm* — INNOVATION CAPITAL LAW GROUP, LLP; Vic Lin (57) ABSTRACT

A safety system for electric motors (101) comprising a safety device (10) for monitoring electric motors (101), the safety device (10) comprises a control unit (12) having at least one input channel (16) connected to the power supply (100) of the electric motor (101) for detecting voltage and frequency on said power supply (100) and for transmitting at least one work signal correlated to the detected voltage and frequency, switching means (15) configured to transmit a control signal, and at least one first processing unit (17), connected to the input channel (16) and to the switching means (15) and configured to control the switching means (15) generating at least one activation signal according to the work signal. The control signal is transmitted in response to the activation signal and the processing unit (17) is configured to compare the work signal with predetermined frequency voltage thresholds.

15 Claims, 10 Drawing Sheets

SAFETY DEVICE, SYSTEM AND METHOD FOR MONITORING AN ELECTRIC MOTOR

TECHNICAL FIELD

The present invention refers to a safety device and a related method for monitoring the functionality of an electric motor.

The device and the method according to the invention are used, by way of example, in industrial machines or systems where it is necessary to monitor the speed of an electric motor to determine whether the machine or the system is in a condition of safety.

STATE OF THE ART

Industrial applications are known wherein it is necessary to monitor the speed of an electric motor of an apparatus.

A first example is the monitoring of the speed of the electric motor to determine whether it is not running, i.e. whether it has a speed equal to zero, in order to allow or not allow a user access to a dangerous area where the electric motor is placed.

This case is typical of automatic or semi-automatic machines such as, for example, band saws, disc saws, etc., wherein the electric motor is used to move loads having a high inertia and which could still be in motion for a period of time after turning off the engine.

A second example is the monitoring of the speed of the electric motor to determine whether it is not running, i.e. whether it has a speed equal to zero, in order to signal to an external device, or to an operator, that the electric motor is actually not running, or in order to signal a situation of emergency.

This case is typical of automatic or semi-automatic machines such as, for example, hoists, cranes, etc., wherein the electric motor is used to lift suspended loads that have a weight sufficient to set the electric motor in motion even when it is no longer powered.

A third example is the monitoring of the speed of the electric motor to determine whether it is within a predetermined range, in order to determine whether the electric motor is working correctly and possibly signal a situation of emergency in the event that the speed of the electric motor is not within the predetermined range. This case is typical of automatic or semi-automatic machines wherein the speed of the electric motor depends on the operating state of the machine, such as, for example, in machines in maintenance mode which require the presence of a maintenance technician inside them, or in semi-automatic machines wherein an interaction is envisaged between a component moved by the electric motor and an operator.

To determine if the electric motor is not running, i.e. if it has a speed equal to zero, it is known to use safety devices, such as the one described in U.S. Pat. No. 6,049,284, which involve measuring the voltage on the phases of the electric motor when it is no longer powered and to compare the measured voltage with a reference voltage.

When the measured voltage is less than the reference voltage then the motor is considered stopped and the safety device signals that the machine is in a condition of safety.

Instead, to determine if the speed of the electric motor is within a predetermined range, it is known to use devices which involve connecting an optical or magnetic sensor to the shaft of the electric motor, which transmits a signal codifying the speed of the electric motor.

Alternatively, to check if the electric motor's speed falls within a set range, it is known to use devices that sample the voltage measured from the motor's power supply to ascertain the motor's rotational frequency.

A first drawback of the devices of the state of the art is that, in case it is necessary to monitor whether the engine of a machine is not running when it is not powered and whether its speed is safe when it is powered, at least two independent and separate devices are required.

This is disadvantageous because it requires a lot of space to place the safety devices inside the machine, as well as complicated wiring operations subject to a high risk of human error.

Furthermore, the use of two independent and separate devices makes it very complicated to check them and verify the presence of any faults, reducing the safety of the machine where they are installed.

A further disadvantage of the prior art is that, in the event of a failure of one of the two independent and separate devices, the aforementioned devices can give inconsistent information and, therefore, decrease the safety level of the machine where they are installed.

Another limitation of the state of the art devices, such as the device described in US2015/346739A1, is that these devices do not provide voltage detection on the phases of the electric motor in order to verify the motion and the rotation speed thereof when it is not powered.

These devices only measure the rotation frequency (speed) as a function of the frequency of the alternating current on the power supply of the electric motor, converting this measured frequency into a corresponding and proportional voltage value, which is used to make comparisons for the detection of faults or anomalous situations.

More in detail, when the motor is not powered, these devices, no longer detecting any frequency on the power supply of the motor, will measure a frequency value equal to zero and consequently also all the voltage values obtained from the frequency conversion will be equal to zero.

Therefore, these devices can be used to measure the rotation speed of an electric motor only when the electric motor is powered and do not measure these parameters when the motor is not powered because it is not running or it is decelerating.

Therefore, these devices cannot monitor the state of an electric motor that is not running or when it is decelerating, for example because it is not powered. An aim of the present invention is therefore to realize a safety device that is compact and easy to install and which makes it possible both to monitor whether the speed of an electric motor is safe, and to verify whether the same electric motor is actually not running when it is not powered.

Another aim of the present invention is to realize a safety device and method that allow the safety level of a machine or system comprising at least one electric motor to be increased.

DESCRIPTION

The safety device 10 according to the present invention is adapted to be associated with a machine or a system, where at least one electric motor 101 is present, and is configured to transmit at least one control signal CF, CV concerning safety of the machine or the system to external users.

For example, the device 10 can be associated with an electrical safety switch of a guard or a door, as well as of a cover or the like, of the machine or the system, to transmit the control signal CF, CV to the latter in order to allow or deny access to the inside of the machine or the system.

Alternatively, or in addition, the device 10 can be associated with safety components such as, for example, emergency brakes, indicators, etc., in order to control their operation by means of the control signal CF, CV.

In a first embodiment, the device 10 makes it possible to control the state of the stopped motor and the rotation speed of the electric motor 101 by detecting the frequency and voltage on the power supply line and by comparing them with respective threshold values.

Alternatively, the device 10 allows at least two detected physical quantities associated with the operation of the electric motor 101 to be compared with each other. Said at least two physical quantities are selected from: the rotation speed of the drive shaft of the electric motor, the voltage measured on the power supply line of the electric motor and the frequency measured on the power supply line of the electric motor. In this case, the comparison is performed to detect any faults or anomalous situations, such as a slipping or blocking of the electric motor 101. With reference to the attached FIGS. 1-7, the device 10 is provided with at least one case 11 containing a control unit 12 having an input section 13, which is connected to the power supply network 100 of the electric motor 101, and a safety section 14, which is provided with switching means 15 through which the control signal CF, CV is transmitted.

The input section 13 is configured to detect the voltage on the power supply 100 and to transmit to the safety section 14 at least one work signal W related to the detected voltage.

Furthermore, the safety section 14 is configured to process the work signal W and to transmit the at least one control signal CF, CV according to the work signal W, as will be described in detail below.

Figure 1:
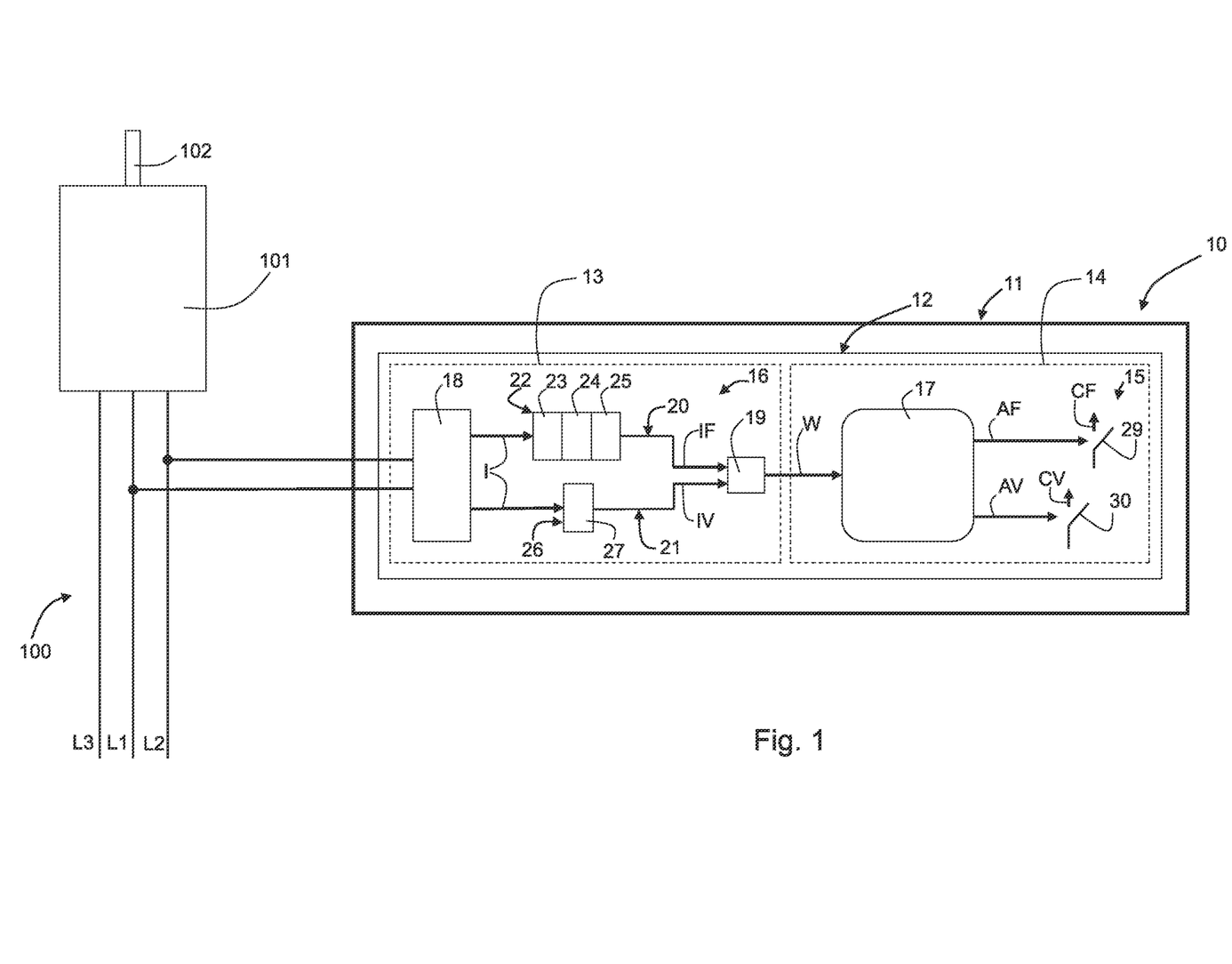
FIGS. 1 to 8 are schematic representations of a safety device in accordance with respective embodiments of the present invention.

In a first embodiment, represented schematically in FIG. 1, the input section 13 comprises a first input channel 16 and the safety section 14 comprises a first processing unit 17 connected to the first input channel 16.

The first input channel 16 is configured to be connected to the power supply 100 of the electric motor 101 in order to instantly detect the voltage on the power supply 100 itself and to transmit to the first processing unit 17 a first work signal W correlated to said detected voltage.

For example, the first input channel 16 is configured to be connected to said power supply line 100 of the electric motor 101 to detect an alternating current on said power supply line 100.

For example, in the event that the power supply 100 of the electric motor 101 is of the three-phase type, the first input channel 16 can be connected in use to two phases L1, L2 of the power supply 100.

Preferably, the first input channel 16 comprises first amplification means 18 and a first measurement unit 19.

The first amplification means 18 are configured to be connected to the power supply 100 to scale the detected voltage in order to transmit to the first measurement unit 19 at least one first intermediate signal I having a voltage value lower than the detected voltage.

It should be noted that in the present description and in the attached claims the term "amplification" also includes cases where a signal is amplified by a value less than one and is therefore attenuated.

In the examples provided herein, the first intermediate signal I is a square wave correlated to the trend over time of the voltage measured between two phases L1, L2 of the power supply 100 of the electric motor 101.

By way of example, the first amplification means 18 comprise a differential amplifier, known per se and which will not be described in detail.

In addition, the amplification means 18 are connected to the first measurement unit 19 by means of a first frequency line 20 and a first voltage line 21.

The first frequency line 20 advantageously comprises first filtering circuits 22 configured to provide the first measurement unit 19 with a first intermediate frequency signal IF filtered by noise and having a maximum value acceptable by the first measurement unit 19. Said first filtering circuits 22 comprise a first order filter 23, a comparator with hysteresis 24 and a voltage divider 25 arranged in series, of a type known per se and which will not be described in detail.

The voltage line 21 comprises attenuation circuits 26 configured to provide the first measurement unit 19 with a first intermediate voltage signal IV having a maximum value acceptable by the measurement unit 19. In particular, the attenuation circuits 26 comprise a voltage divider voltage 27, which is known per se and will not be described in detail.

The first measurement unit 19 is configured to sample the first intermediate frequency signal IF and the first intermediate voltage signal IV. Furthermore, the first measurement unit 19 is configured to perform a measurement of the first intermediate frequency signal IF to obtain frequency information of the electric motor 101. In this case, this measurement provides the measurement of the period of the first intermediate frequency signal IF and therefore its frequency.

It should be noted that in the present description and in the attached claims the term "frequency" means a quantity correlated to the rotation speed of the electric motor 101.

Furthermore, the first measurement unit 19 is configured to perform a measurement of the first intermediate voltage signal IV to obtain voltage information correlated to the voltage applied to the power supply 100. In this case, the first measurement unit 19 instantaneously measures the voltage of the first intermediate voltage signal IV and the measured value corresponds to said voltage information.

The first measurement unit 19 is configured to transmit to the first processing unit 17 the aforementioned first work signal W containing said frequency information and said voltage information, preferably in digital form.

The first processing unit 17 can comprise a memory unit (not shown) where a predetermined frequency threshold F and a predetermined voltage threshold V are stored. Furthermore, the first processing unit 17 is configured to compare the frequency information and the voltage information contained in said first work signal W with a frequency threshold F and a voltage threshold V. Alternatively, the unit memory (not shown) can be external to the first processing unit 17 and communicating with it.

The comparison between the frequency information and the frequency threshold F is performed to determine whether the rotation speed of the electric motor 100 falls within a range considered safe for the machine or the system.

For example, the frequency threshold F can be a maximum value for the frequency of the electric motor 101, or a minimum value for the frequency of the electric motor 101. Alternatively, the frequency threshold can be defined by a range between a maximum value and a minimum value for the frequency of the electric motor 101.

The comparison between the voltage information and the voltage threshold V is performed to determine whether the electric motor 101 is not running, i.e. has zero rotation speed.

For example, the voltage threshold V is a maximum value for the voltage information.

Advantageously, according to the present invention, it is possible to detect the rotation speed of the electric motor 101 even when the latter is not powered and/or is in the deceleration phase.

Again advantageously, according to the present invention it is possible to compare with respective thresholds the voltage and the frequency detected directly on the motor power supply. The frequency on the power supply is evaluated when the motor is powered to detect its rotation speed, while the voltage on the power supply is evaluated when the motor is not powered to evaluate whether it is not running or is rotating and/or decelerating.

Even more advantageously, the present invention allows both the voltage and the frequency of the alternating current on the motor power supply to be compared with respective thresholds, so as to allow the speed of the electric motor 101 to be detected both when it is supplied and moving, and when it is decelerating or stopped due to the absence of power supply.

More in detail, the frequency of the alternating current is compared with the respective frequency threshold for the evaluation of the speed when the electric motor 101 is powered, while the residual voltage detected on the motor supply phases is compared with the respective voltage threshold when the electric motor 101 is not powered to evaluate whether the electric motor 101 is not running or is decelerating.

The first processing unit 17 is further configured to transmit a first frequency activation signal AF to the switching means 15 if from the comparison between the frequency information and the frequency threshold F it is found that the frequency of the electric motor 101 falls within the range considered safe. For example, the first frequency activation signal AF can be transmitted if the frequency information is less than a maximum frequency threshold F or if the frequency information is greater than a minimum frequency threshold F, or even if the frequency information falls within the range considered safe.

In addition, the first processing unit 17 is configured to transmit a first voltage activation signal AV to the switching means 15 if from the comparison between the voltage information and the voltage threshold V it is found that the speed of the electric motor 101 is zero. For example, the first voltage activation signal AV can be transmitted if the voltage information is less than the voltage threshold V. In the non-limiting example of FIG. 1, the switching means 15 comprise a frequency switching element 29 of the normally open type, which is connected to the first processing unit 17 and which is configured to switch from an open state to a closed state in response to the first frequency activation signal AF. Furthermore, the switching means 15 comprise a voltage switching element 30 of the normally open type, connected to the first processing unit 17, and which is configured to switch from an open state to a closed state in response to the first voltage activation signal AV.

The switching from the open state to the closed state of the frequency switching element 29 corresponds to a frequency control signal CF, and the transition from the open state to the closed state of the voltage switching element 29 corresponds to a voltage control signal CV.

In some embodiments, the first processing unit 17 is configured to perform a consistency control between the voltage information and the frequency information contained in said first work signal W. For example, the consistency control involves verifying that when the voltage information is less than the voltage threshold V, also the frequency information is less than a lower frequency limit, corresponding for example to 1 Hz.

Advantageously, this configuration allows the presence of faults upstream of the first processing unit 17 to be deduced and, therefore, the level of safety provided by the device 10 of the invention to be increased.

It should be noted that the frequency threshold F and the voltage threshold V can also be variable depending on the time or phases of a work cycle of the machine or the system where the electric motor 101 is present, for example during a phase of acceleration or braking provided for the electric motor 101.

Figure 4:
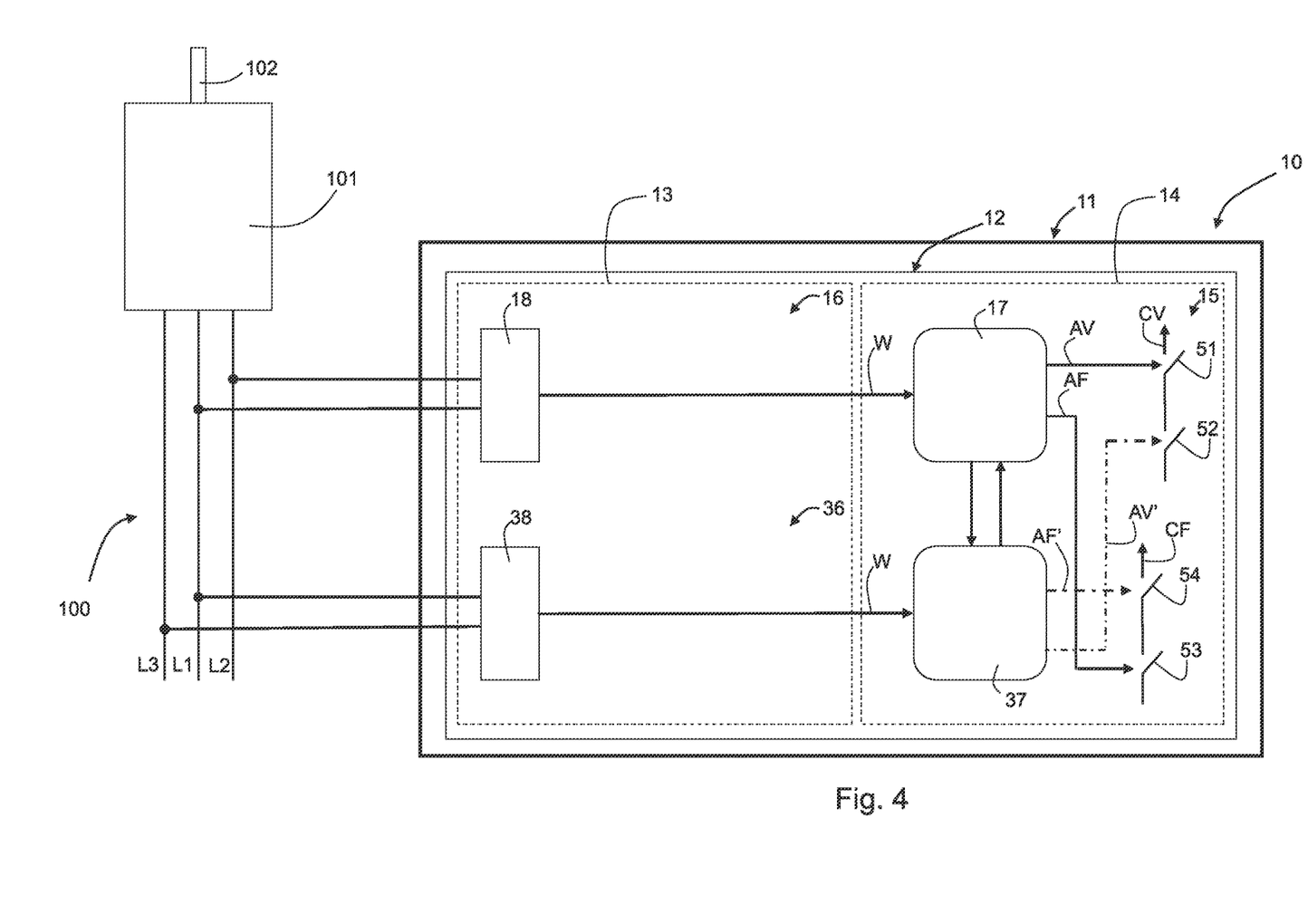

In a possible variant embodiment represented in FIG. 4, the first amplification means 18 can be connected directly to the first processing unit 17 to transmit a first work signal W thereto, preferably in analog form. In this case, the first processing unit 17 can be configured to execute FFT (Fast Fourier Transform) algorithms to obtain the frequency information. Furthermore, the first processing unit 17 can be configured to measure the voltage of the work signal W to obtain the voltage information.

Figure 5:
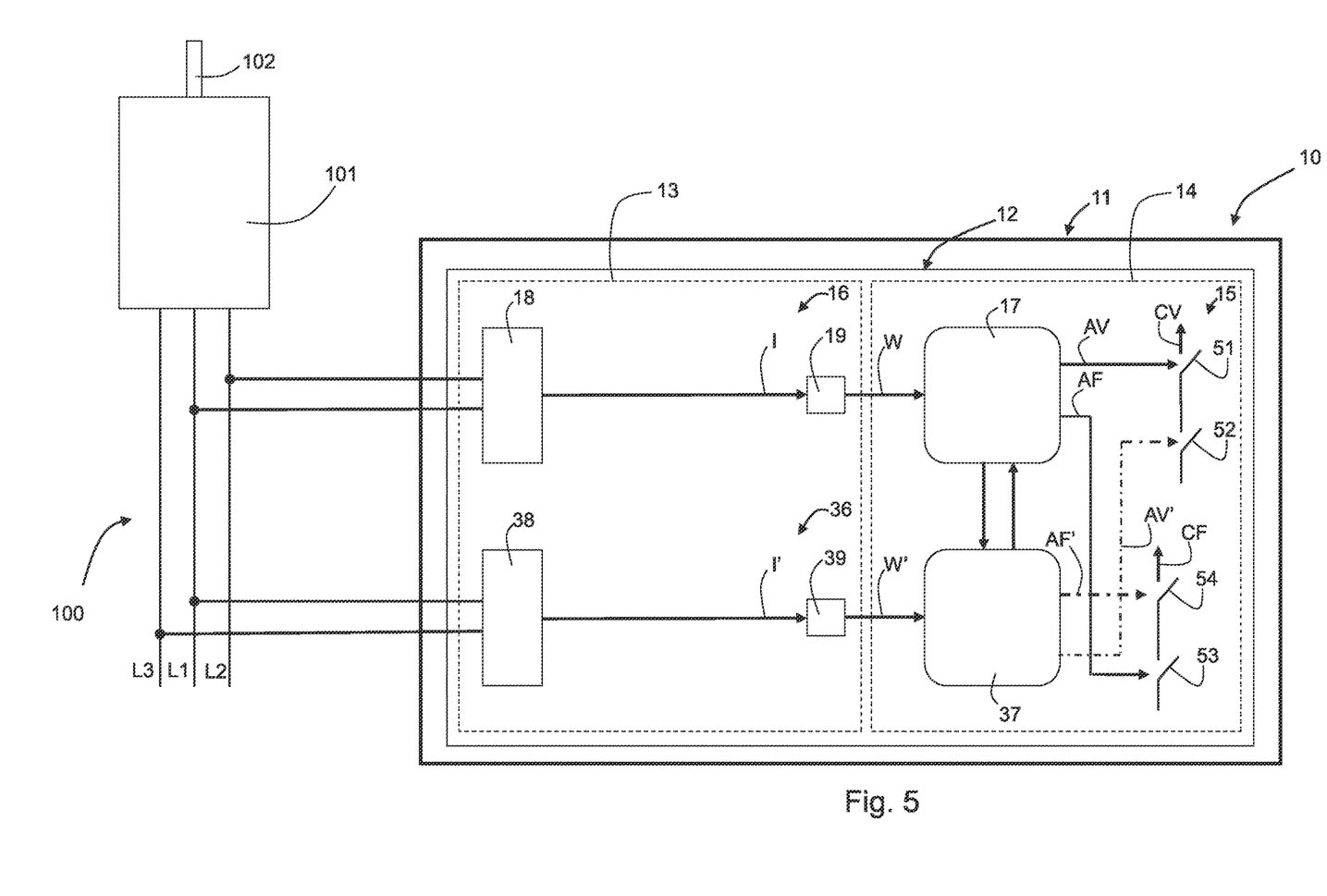

Or again, in a possible variant embodiment represented in FIG. 5, the first amplification means 18 can be connected directly to the first measurement unit 19 to transmit a single intermediate signal I thereto. In this case, the first measurement unit 19 can be configured to perform FFT (Fast Fourier Transform) algorithms to obtain the frequency information. Furthermore, the first measurement unit 17 can be configured to measure the voltage of the intermediate signal I to obtain the voltage information.

Figure 2:
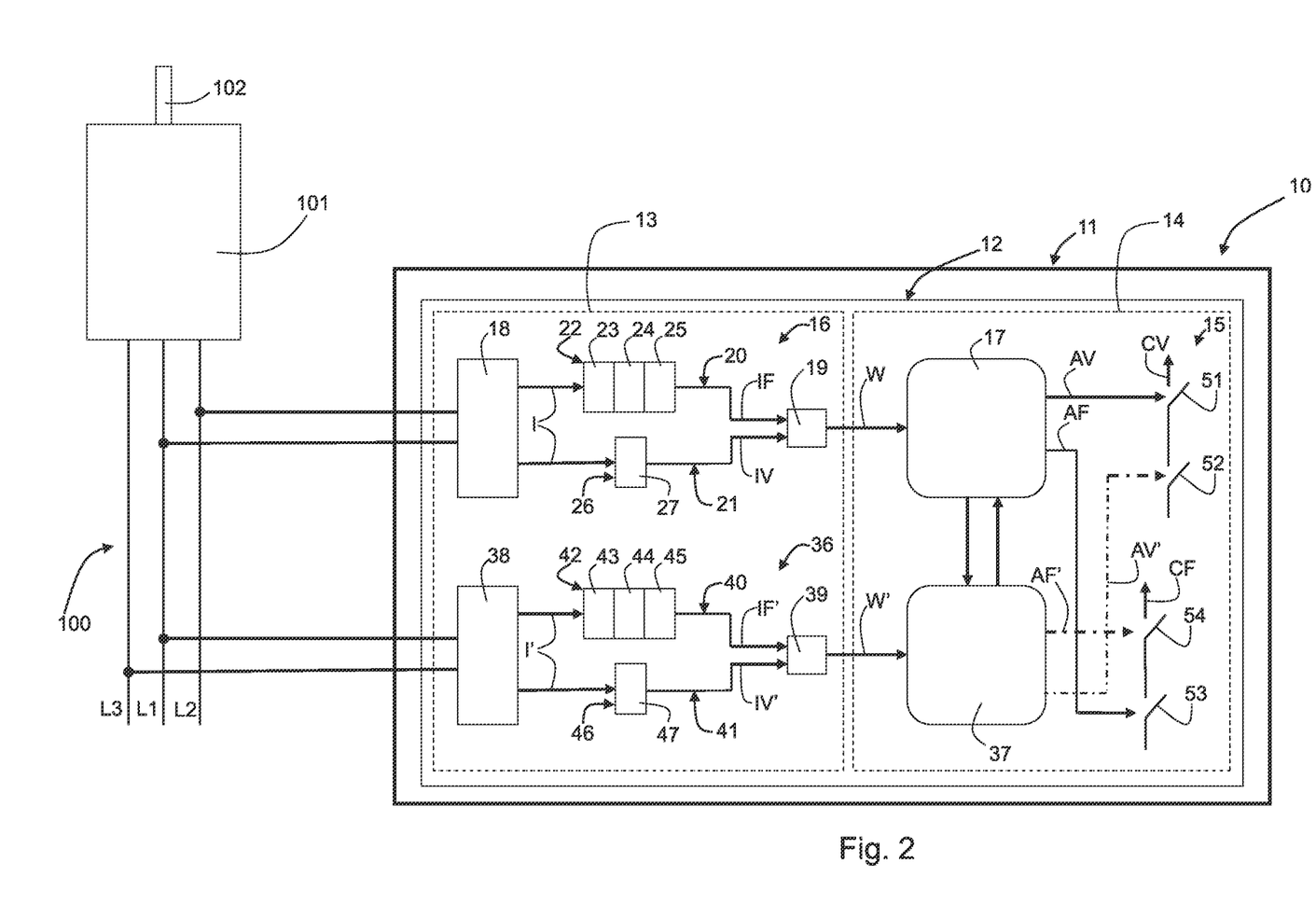

In another embodiment of the invention, represented schematically in FIG. 2, the input section 13 also comprises a second input channel 36 and the safety section 14 also comprises a second processing unit 37 connected to the second input channel 36.

The second input channel 36 is configured to be connected to the power supply 100 of the electric motor 101, in order to instantly detect the voltage applied to the power supply 100 itself and transmit to the second processing unit 37 a second work signal W' correlated to said voltage detected.

For example, the second input channel 36 is configured to be connected to said supply line 100 of the electric motor 101 to detect an alternating current on said supply line 100.

For example, in case the power supply 100 of the electric motor 101 is of the three-phase type, the second input channel 36 can be connected in use to two phases L1, L3 of the power supply 100. Preferably, at least one of the two phases L1, L3, to which the second input channel 36 is connected in use, is different from the two phases L1, L2 to which the first input channel 16 is connected in use.

Preferably, the second input channel 36 comprises second amplification means 38 and a second measurement unit 39.

The second amplification means 38 are configured to be connected to the power supply 100 and to scale the detected voltage in order to transmit to the second measurement unit 39 at least one second intermediate signal I' having a voltage value lower than the detected voltage.

For example, the second intermediate signal I' is a square wave correlated to the trend over time of the voltage measured between two phases L1, L3 of the power supply 100 of the electric motor 101.

Merely by way of example, the second amplification means 38 comprise a differential amplifier, known per se and which will not be described in detail.

In the example represented in FIG. 2, the second amplification means 38 are connected to the second measurement unit 39 by means of a second frequency line 40 and a second voltage line 41.

The second frequency line 40 comprises second filtering circuits 42 of the second intermediate signal configured to provide the second measurement unit 39 with a second intermediate frequency signal IF' filtered by noise, and having a maximum value acceptable by the second measurement unit 39. In the example given herein, the second filtering circuits 42 comprise a first order filter 43, a comparator with hysteresis 44 and a voltage divider 45 which are known per se and will not be described in detail. One skilled in the art easily understands that the second filtering circuits 42 can also be different from what is described in this example.

The voltage line 41 comprises attenuation circuits 46 configured to provide the second measurement unit 39 with a second intermediate voltage signal IV' having a maximum voltage value acceptable by the second measurement unit 39. In particular, the attenuation circuits 46 comprise a voltage divider 47 which is known per se and will not be described in detail. Also in this case, one skilled in the art easily understands that the second attenuation circuits 46 can also be different from what is described in this example.

The second measurement unit 39 is configured to sample the second intermediate frequency signal IF' and the second intermediate voltage signal IV'. Furthermore, the second measurement unit 39 is configured to process the second intermediate frequency signal IF' to obtain frequency information of said electric motor 101. This processing can provide the measurement of the period of the second intermediate frequency signal IF' and therefore its frequency.

Furthermore, the second measurement unit 39 is configured to process the second intermediate voltage signal IV' to obtain voltage information correlated to the voltage measured on the power supply 100. In the example provided herein, the second measurement unit 39 instantly measures the voltage of the second intermediate voltage signal IV' and the measured value corresponds to said voltage information.

The second measurement unit 39 is configured to transmit to the second processing unit 37 the aforementioned second work signal W' containing said frequency information and said voltage information, preferably in digital form.

Also the second processing unit 37 can comprise a memory unit (not shown) in which said predetermined frequency threshold F and said voltage threshold V are stored. Alternatively, the memory unit (not shown) can be external to the second processing unit 37 and connected thereto.

Furthermore, the second processing unit 37 is configured to compare the frequency information and the voltage information contained in said second work signal W' with a frequency threshold F and a voltage threshold V.

Also in this case, the comparison between the frequency information and the frequency threshold F is performed to determine whether the rotation speed of the electric motor 101 falls in a range considered safe for the machine or the system. Furthermore, the comparison between the voltage information and the voltage threshold V is performed to determine whether the electric motor 101 is not running, i.e. it has zero rotation speed.

The second processing unit 37 is furthermore configured to transmit a second frequency activation signal AF' to the switching means 15 if from the comparison between the frequency information and the frequency threshold F it is found that the frequency of the electric motor 101 falls within the range considered safe. For example, the second frequency activation signal AF' can be transmitted if the frequency information is less than a maximum frequency threshold F or if the frequency information is greater than a minimum frequency threshold F or even if the frequency information falls within a range considered safe.

The second processing unit 37 is furthermore configured to transmit a second voltage activation signal AV' to the switching means 15 if from the comparison between the voltage information and the voltage threshold V it is found that the speed of the electric motor 101 is zero.

In the embodiment of FIG. 2, the switching means 15 comprise a first and a second voltage switching element 51, 52, arranged in series, and a first and a second frequency switching element 53, 54, also arranged in series.

The series of voltage switching elements 51, 52 is configured to transmit a voltage control signal CV and the series of frequency switching elements 53, 54 is configured to transmit a frequency control signal CF.

In this case, the first voltage switching element 51 is connected to the first processing unit 17, which is configured to transmit the first voltage activation signal AV thereto. Furthermore, the second voltage switching element 52 is connected to the second processing unit 37, which is configured to transmit the second voltage activation signal AV' thereto.

In addition, the first frequency switching element 53 is connected to the first processing unit 17, which is configured to transmit the first frequency activation signal AF thereto. Furthermore, the second frequency switching element 54 is connected to the second processing unit 37, which is configured to transmit the second frequency activation signal AF' thereto.

Preferably, also the second processing unit 37 is configured to perform a consistency comparison between the voltage information and the frequency information contained in said second work signal W'. For example, the consistency comparison provides verification that when the voltage information is less than the voltage threshold V, also the frequency information is less than a lower frequency limit, equal for example to 1 Hz.

Advantageously, this configuration allows the presence of faults upstream of the second processing unit 37 to be deduced and, therefore, the level of safety provided by the device 10 of the invention to be increased.

In alternative embodiments, an example of which is shown in FIG. 4, the second amplification means 38 can be connected directly to the second processing unit 37 to transmit the second work signal W' thereto, preferably in analog form. In this case, the second processing unit 37 can be configured to execute FFT (Fast Fourier Transform) algorithms to obtain the frequency information.

Or again, in other variant embodiments, an example of which is shown in FIG. 5, the second amplification means 38 can be connected directly to the second measurement unit 39 to transmit a single intermediate signal I' thereto. In this case, the second measurement unit 39 can be configured to perform FFT (Fast Fourier Transform) algorithms to obtain the frequency information.

Figure 3:
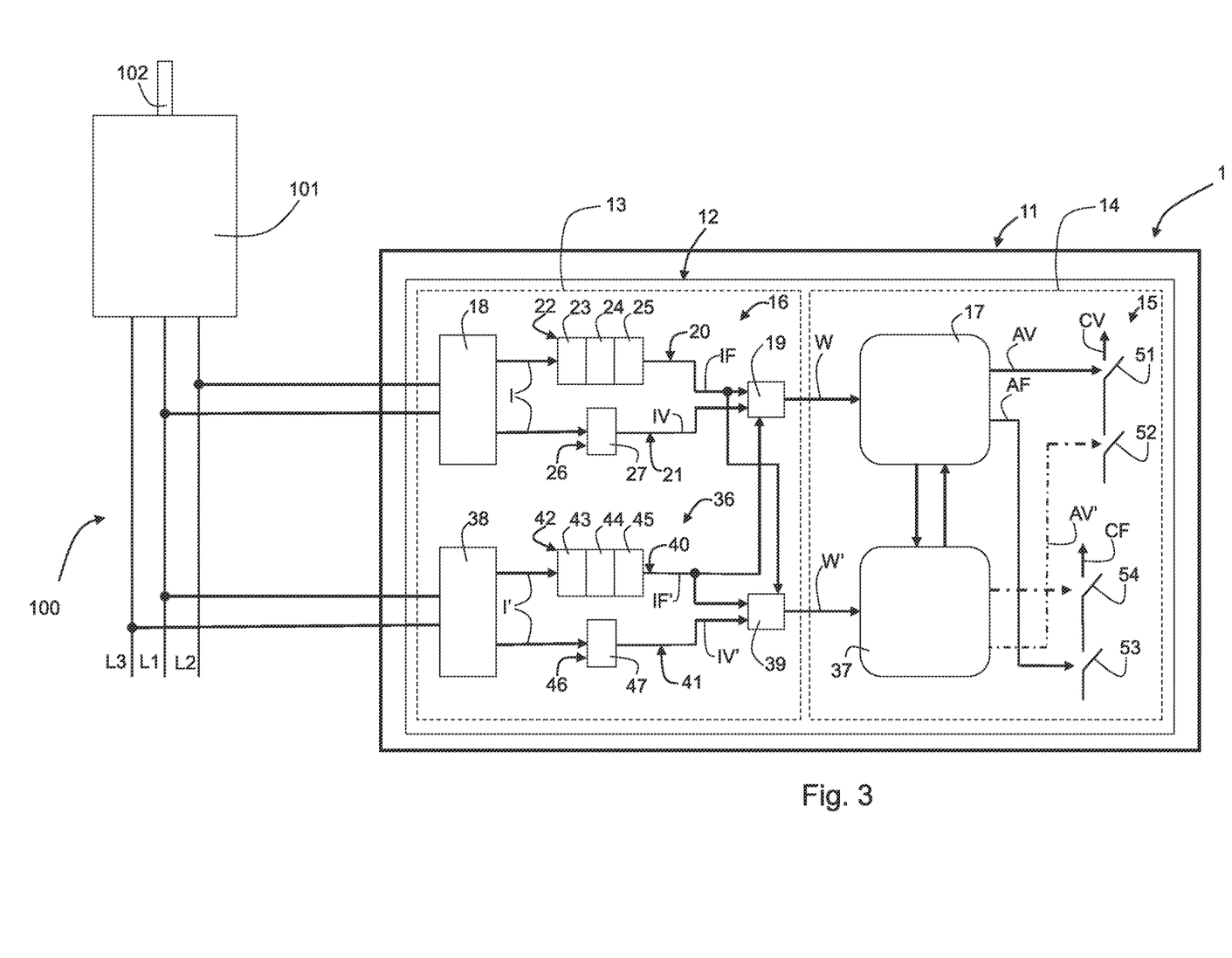
Figure 7:
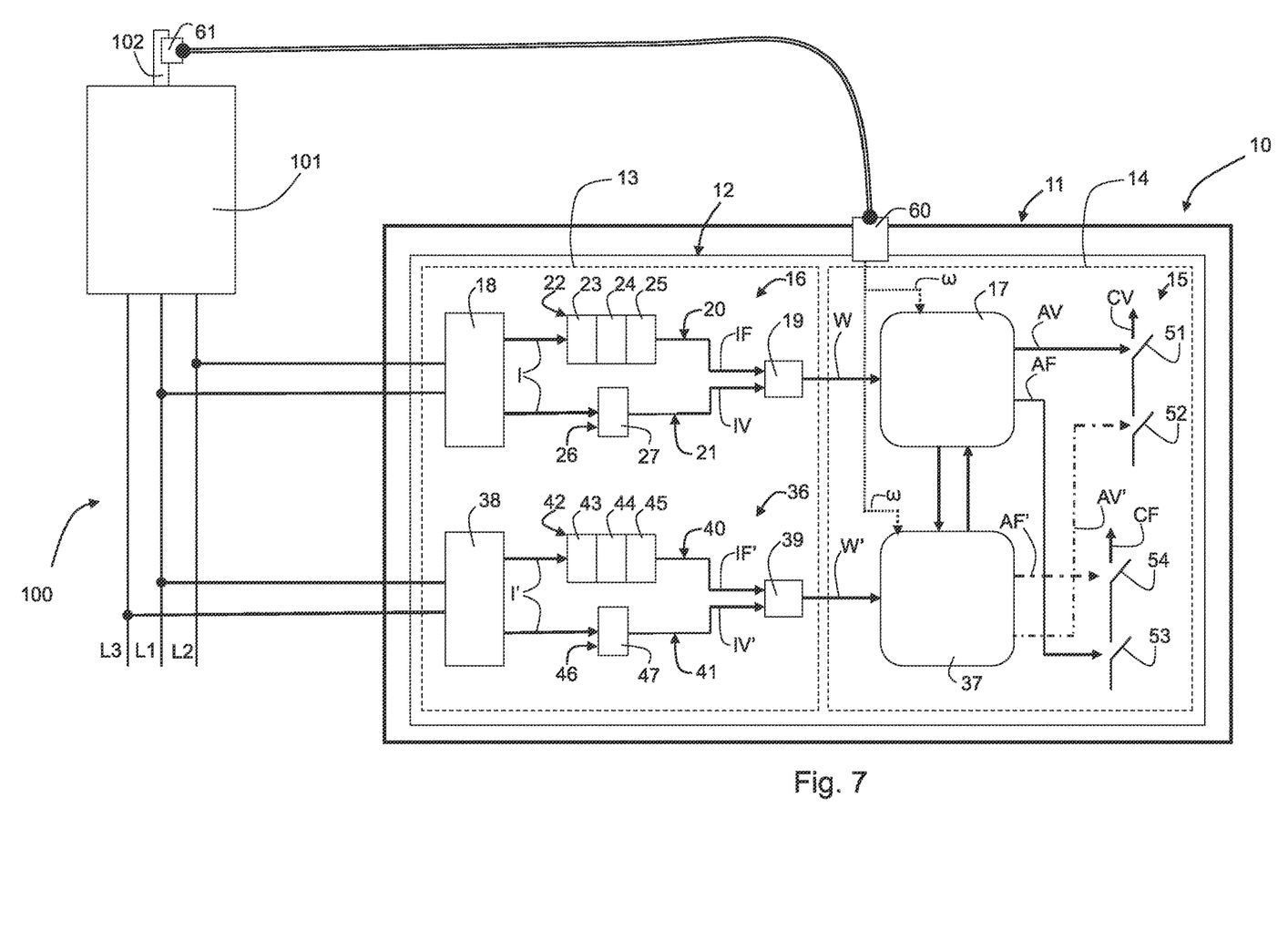

Optionally, in some embodiments represented schematically in FIGS. 3 and 7, the first frequency line 20 can also be connected to the second measurement unit 39 to transmit the first intermediate frequency signal IF thereto and the second frequency line 40 can also be connected to the first measurement unit 19 to transmit the second intermediate frequency signal IF' thereto.

In these embodiments, the first measurement unit 19 is also configured to compare the first intermediate frequency signal IF with the second intermediate frequency signal IF', in order to determine the direction of rotation of the electric motor 101. Furthermore, also the second measurement unit 39 is configured to compare the first intermediate frequency signal IF with the second intermediate frequency signal IF', in order to determine the direction of rotation of the electric motor 101.

In this case, the first work signal W also contains direction information coding the direction of rotation of the electric motor 101. Furthermore, also the second work signal W' contains direction information coding the direction of rotation of the electric motor 101. For example, the value 0 can be assigned to a bit of said work signal W if the determined direction is clockwise and the value 1 if it is anti-clockwise, or vice versa.

Furthermore, at least one of the first and second processing units 17, 37 is also configured to transmit the direction information to a non-safe type output (not represented in the drawings). For example, the non-safe type output can be connected to signaling devices such as displays, light elements or others. Advantageously, this allows a user to be informed of the direction of rotation of the electric motor 101 and to evaluate whether this detected direction of rotation corresponds to an expected direction of rotation.

Optionally, the control unit 12 also includes a sensor input 60 (FIGS. 6, 7, 8) connected to at least one of the processing units 17, 37 and an external rotation sensor 61 connected to the aforementioned sensor input 60 and configured for being placed in correspondence with the drive shaft 102 of said electric motor 101.

Figure 6:
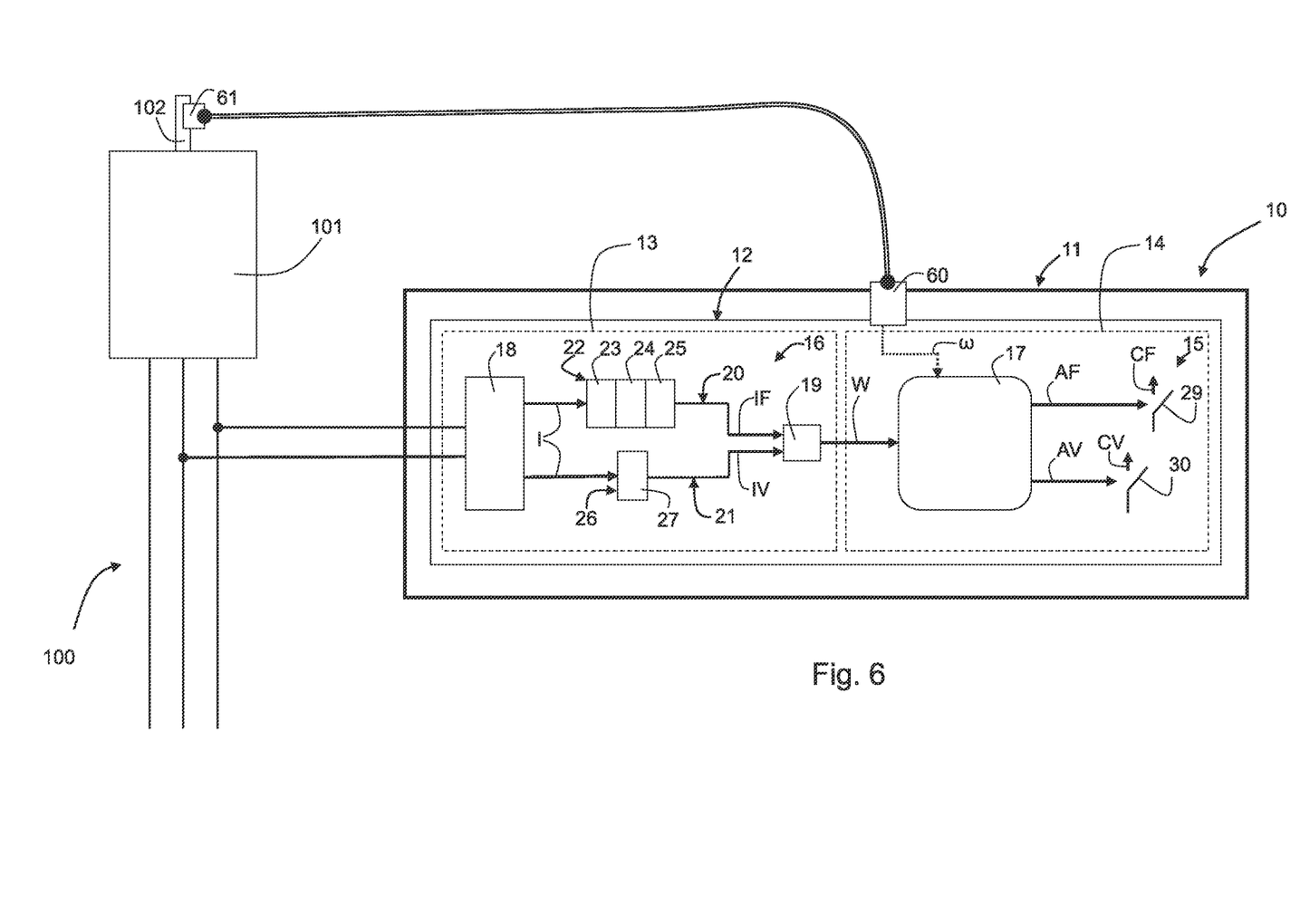
Figure 8:
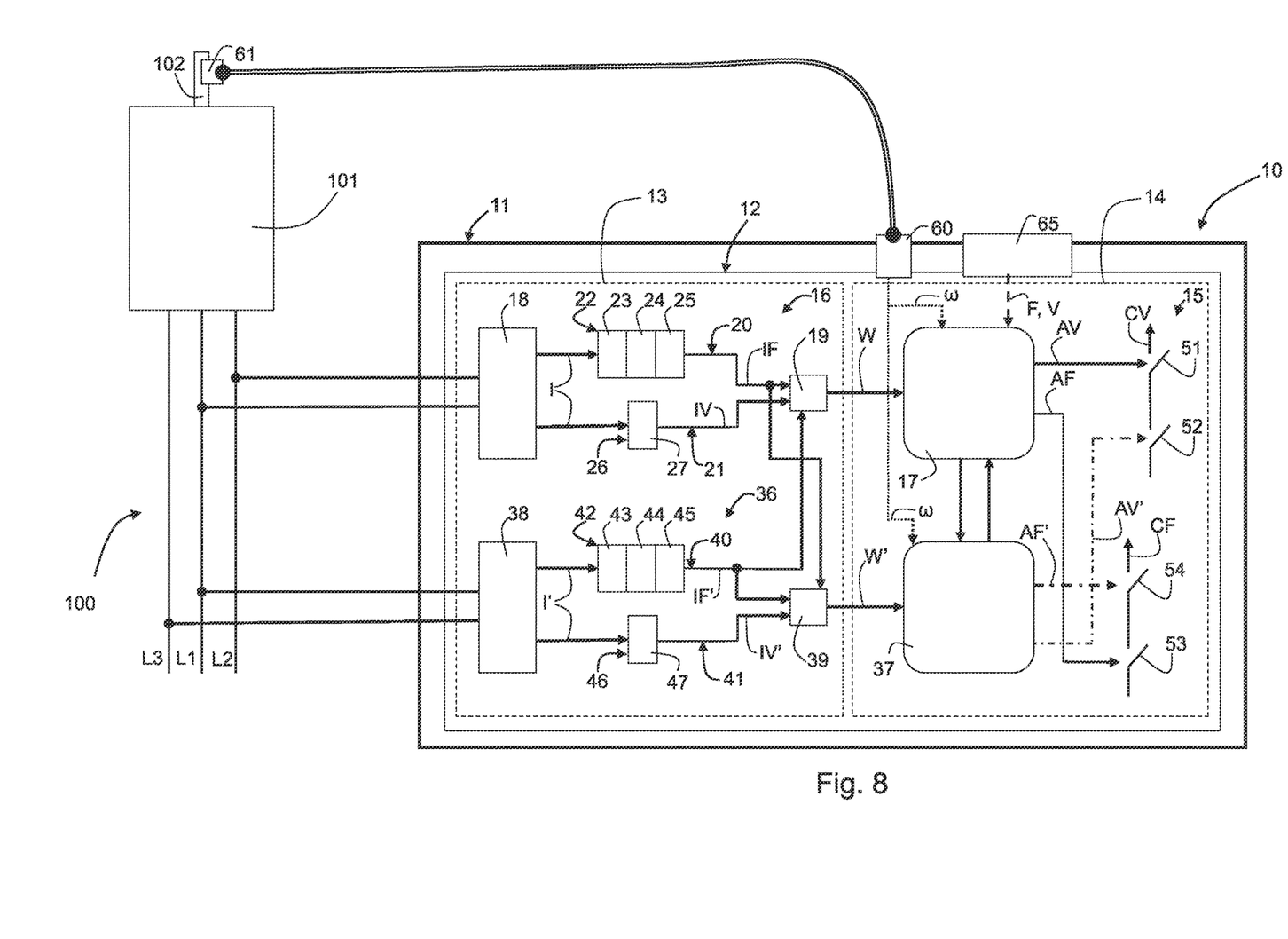

The rotation sensor 61 is configured to calculate the rotation speed of the drive shaft 102 by verifying its position over time and to transmit a speed signal ω to at least one of the processing units 17, 37. For example, the rotation sensor 61 can comprise an inductive sensor, or a dynamo, or an encoder.

In these embodiments, at least one of the first and second processing units 17, 37 is also configured to compare the aforementioned speed signal ω with the voltage or frequency information. Advantageously, this makes it possible to detect any slipping or blocking conditions of the electric motor 101 to signal a fault or a malfunction situation of the machine.

Optionally, the control unit 12 also comprises an auxiliary input 65 (FIG. 8) connected to at least one of the two processing units 17, 37. The auxiliary input 65 is configured to allow the transmission of information between external devices and at least one of the first and second processing units 17, 37. For example, the auxiliary input 65 is configured to receive the frequency threshold F and the voltage threshold V from an external device and to transmit them to at least one of the first and second processing units 17, 37. By way of example, the auxiliary input 65 can comprise a USB connector, preferably of the USB-C type. Alternatively, or in addition, the auxiliary input 65 can comprise an industrial field bus or a point-to-point communication bus, such as, for example, the IO-link bus. Preferably, the first and second processing units 17, 37 are connected in a redundant manner to each other to perform a consistency control between the first and second work signals W, W'.

Advantageously, this configuration allows the presence of faults in the first and/or second input channels 16, 36 to be deduced and, therefore, the level of safety provided by the device 10 of the invention to be increased.

Preferably, but not necessarily, the input section 13 and the safety section 14 are obtained from a single printed circuit and are separated from each other by an insulating barrier (not shown). Advantageously, the insulating barrier also cooperates with the walls of the case 11 to define an electrical separation between the input section 13 and the safety section 14. This makes it possible to avoid any malfunctions or faults of the safety section 14 caused by the high voltage in the input section 13, consequently increasing the safety level of the device 10 of the invention.

For example, the insulating barrier can consist of one or more photo-couplers, or opto-isolators, arranged between the input channels 16, 36 and the processing units 17, 37. For example, a first photo-coupler can be interposed between the first measurement unit 19 and the first processing unit 17 to transmit the first work signal W and a second photocoupler can be interposed between the second measurement unit 39 and the second processing unit 37 to transmit the second work signal W'.

Figure 9:
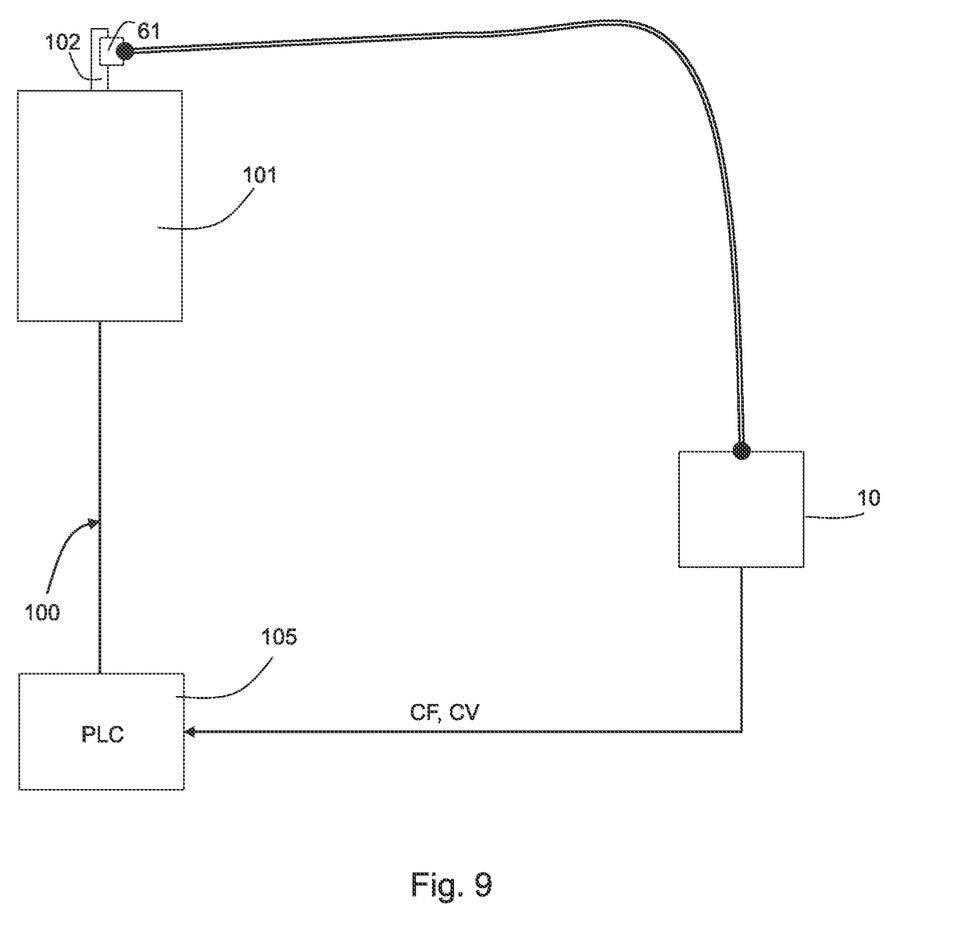
FIG. 9 is a schematic representation of a system in accordance with an embodiment of the present invention.

FIG. 9 shows a block diagram of a safety system comprising the electric motor 101, which is connected to a power supply line 100, and the safety device 10, wherein at least the first channel 16 is connected to the power supply line 100 to detect the frequency of the alternating current on the power supply of the electric motor 101 in order to obtain a voltage value and a frequency value.

The system in FIG. 9 also includes a controller 105, such as a PLC of a machine or a system, which is connected to the switching means 15 and which is configured to receive the control signal CF, CV and to control the electric motor 101 according to the control signal CF, CV.

More specifically, preferably, the controller 105 controls an inverter (not shown in FIG. 9) which, in turn, controls the electric motor 101 and the safety device 10 communicates with the controller 105 and also directly controls two contactors placed upstream of the inverter (which are also not shown) to cut off power to the electric motor 101 in the event that an unsafe situation occurs.

Figure 10:
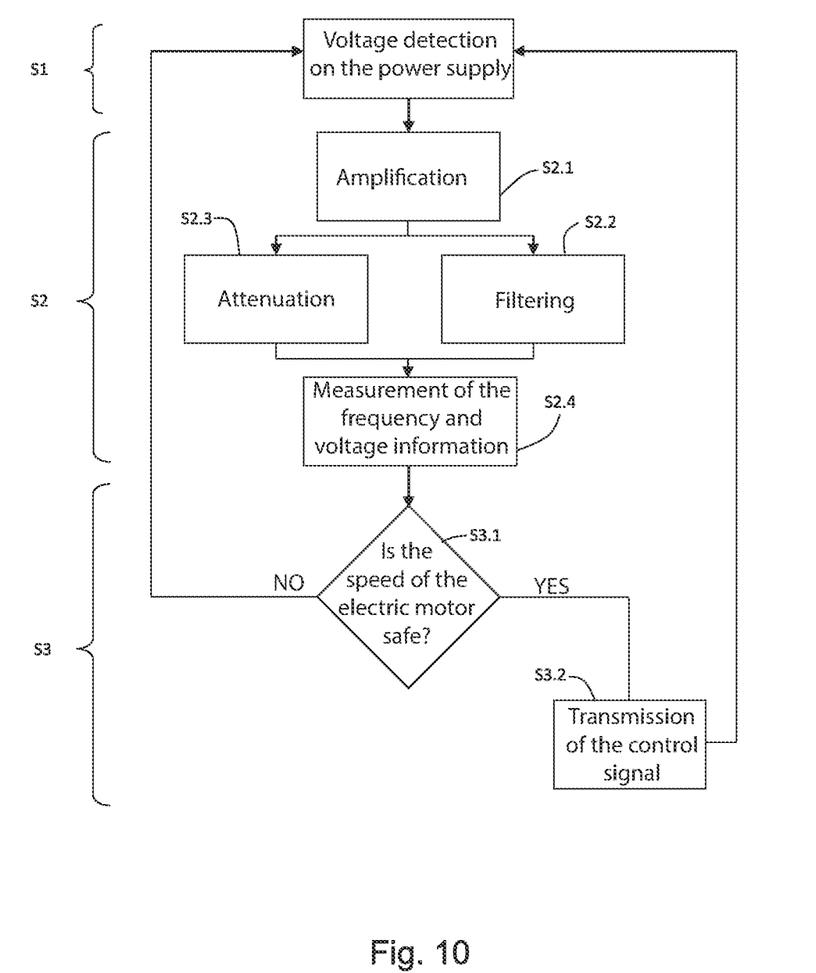
FIG. 10 is a flowchart of the safety method in accordance with an embodiment of the present invention.

With reference to FIG. 10, the safety method of the present invention, corresponding to the operation of the device 10, comprises the following steps.

The method essentially comprises a detection phase S1, according to which at least the first input channel 16 detects the voltage and frequency on the power supply line 100 of the electric motor 101.

Furthermore, the method comprises a preparation phase S2, according to which at least the first input channel 16 processes the voltage and frequency detected on the power supply line 100 and transmits at least one first work signal W to at least one first processing unit 17.

Subsequently, the method provides a processing phase S3, according to which the at least one first processing unit 17 compares the first work signal W with at least one predetermined frequency threshold F and with at least one predetermined voltage threshold V.

In the event that the procedure is carried out by a safety device 10 in accordance with the embodiment represented schematically in FIG. 2, during the detection phase S1, each input channel 16, 36 detects the voltage and frequency on the power supply line 100 of the electric motor 101.

Furthermore, in this case, during the preparation phase S2, each input channel 16, 36 processes the detected voltage and frequency to transmit a respective work signal W, W' to the respective processing unit 17, 37.

During the preparation phase S2, the first input channel transmits the first work signal W to the first processing unit 17 and the second input channel 36 transmits the second work signal W' to the second processing unit 37.

Optionally, the preparation phase S2 can provide an amplification sub-phase S2.1, according to which the amplification means 18, 38 scale the detected voltage and transmit to the respective measurement unit 19, 39 at least one respective intermediate voltage signal IV, IV' having a lower value than the detected value.

Furthermore, the preparation phase S2 can also comprise a filtering sub-phase S2.2, according to which each intermediate signal I is filtered by the respective filtering circuits 22, 42 to provide the respective measurement unit 19, 39 with a respective intermediate frequency signal IF, IF'. In addition, the preparation phase S2 can also comprise an attenuation sub-phase S2.3, according to which each intermediate signal I is attenuated by the respective attenuation circuits 26, 46 to provide the respective measurement unit 19, 39 with a respective intermediate voltage signal IV, IV'.

The preparation phase S2 also comprises a measurement sub-phase S2.4, according to which each measurement unit 19, 39 performs a measurement of the respective intermediate frequency signal IF, IF' and of the intermediate voltage signal IV, IV' to obtain frequency information and voltage information. Furthermore, during the measurement sub-phase S2.4, each measurement unit 19, 39 transmits to the respective processing unit 17, 37 a work signal W, W' containing the respective frequency information and the respective voltage information.

Optionally, if provided, during the measurement sub-phase S2.4, the first measurement unit 19 also processes the second intermediate frequency signal IF' and the second measurement unit 39 also processes the first intermediate frequency signal IF to measure information on the direction of rotation of the electric motor 101. In this case, each measurement unit 19, 39 transmits to the respective processing unit 17, 37 a work signal W, W' also containing the respective information on the direction of rotation.

Advantageously, during the processing phase S3, each processing unit 17, 37 transmits an activation signal AF, AV, AF', AV' to the switching means 15 according to the respective work signal W, W'. In particular, during the processing phase S3, each processing unit 17, 37 compares the frequency information of the respective work signal W, W' with at least one predetermined frequency threshold F and the voltage information of the respective work signal work W, W' with at least one predetermined voltage threshold V.

According to another embodiment, the method object of the invention provides a detection phase S1, according to which at least the first input channel 16 detects the voltage or frequency on the power supply line 100 of the electric motor 101, a preparation phase S2, according to which at least the first input channel 16 processes the voltage or frequency detected on the power supply line 100 and transmits at least one first work signal W to at least one first processing unit 17, and a processing phase S3, according to which the at least one first processing unit 17 transmits an activation signal AF, AV to the switching means 15 according to the at least one first work signal W and compares the voltage or frequency information of the at least one first work signal W, respectively, with a predetermined voltage threshold V or with a frequency threshold F. In this case, the method according to the invention also uses the rotation sensor 61, which detects the rotation speed of the electric motor 101, by the sensor input 60 connected to at least one first processing unit 17, and transmits a rotation speed signal ω of the electric motor 101 to the at least one first processing unit 17.

Obviously, also according to this embodiment, two input channels 16, 36 can be provided for the transmission of respective work signals W, W' to respective processing units 17, 37 and the preparation phase S2 can provide an amplification phase S2.1, a filtering phase S2.2, an attenuation phase S2.3 and a measurement phase S2.4, with operating modes similar to those described previously.

From the above description, the features of the safety device and method for controlling an electric motor, which are the object of the present invention, are clear, as are the advantages deriving from them.

The invention thus conceived is susceptible to numerous modifications and variations, all of which fall within the scope of protection of the attached claims.

Furthermore, all details can be replaced by other technically equivalent elements; in practice, the materials used, as well as the contingent shapes and dimensions, can be varied based on contingent needs and the state of the art.

Where the construction features and techniques mentioned in the following claims are followed by reference numbers, such reference numbers have been affixed for the sole purpose of increasing the comprehensibility of the claims and, consequently, do not constitute in any way a limitation on the interpretation of each identified element.

The invention claimed is:

1. A safety device (10) configured to monitoring an electric motor (101), said electric motor (101) being connected to a power supply line (100), characterized in that said safety device (10) comprises a control unit (12) having:
   at least one first input channel (16) configured to be connected to a power supply line (100) of the electric motor (101) to detect a voltage and a frequency on said power supply line (100) and to transmit at least one first work signal (W) correlated to said detected voltage and frequency, wherein said voltage is correlated to a state of stopped or running engine and said frequency is correlated to the rotation speed of said electric motor (101),
   switching means (15) configured to transmit a control signal (CF, CV),
   at least one first processing unit (17) connected to said first input channel (16) and to said switching means (15) and configured to control said switching means (15) generating at least one first activation signal (AV, AF) according to said at least one first work signal (W),
   wherein said control signal (CF, CV) is transmitted in response to said at least one first activation signal (AV, AF),
   wherein said at least one first processing unit (17) is configured to compare said at least one first work signal (W) with at least one predetermined frequency threshold (F) and with at least one predetermined voltage threshold (V), and
   wherein said first input channel (16) comprises at least one first measurement unit (19) connected to said at least one first processing unit (17) and first amplification means (18) configured to be connected to said power supply line (100) and to transmit to said first measurement unit (19) at least one first intermediate voltage signal (IV) and at least one first intermediate frequency signal (IF), said first measurement unit (19)

being configured to measure said at least one first intermediate voltage signal (IV) and said at least one first intermediate frequency signal (IF) and to transmit said at least one first work signal (W) to said at least one first processing unit (17).

2. The safety device as in claim 1, characterized in that said first channel (16) comprises a first frequency line (20), which is interposed between said first amplification means (18) and said first measurement unit (19) and which comprises filtering circuits (22) of said first intermediate frequency signal (IF), and a first voltage line (21), which is interposed between said first amplification means (18) and said first measurement unit (19) and which comprises attenuation circuits (26) of said first intermediate voltage signal (IV).

3. The safety device as in claim 1, characterized in that said control unit (12) further comprises:
at least one second input channel (36) configured to be connected to said power supply line (100) of said electric motor (101) in order to detect the voltage and frequency on said power supply line (100) and to transmit at least one second work signal (W') correlated to said voltage and said frequency detected on the power supply line (100),
a second processing unit (37) connected to said at least one second input channel (36) and to said switching means (15) and configured to control said switching means (15) generating at least one second activation signal (AV', AF') according to said at least one second work signal (W'), said second processing unit (37) being configured to compare said at least one second work signal (W') with said predetermined frequency threshold (F) and with said predetermined voltage threshold (V).

4. The safety device as in claim 3, characterized in that said switching means (15) comprise two voltage switching elements (51, 52) arranged in series and configured to transmit a voltage control signal (CV) and two frequency switching elements (53, 54) arranged in series and configured to transmit a frequency control signal (CF).

5. The safety device as in claim 4, characterized in that a first voltage switching element (51) is connected to said first processing unit (17) and a second voltage switching element (52) is connected to said second processing unit (37), and that a first frequency switching element (53) is connected to said first processing unit (17) and a second frequency switching element (54) is connected to said second processing unit (37).

6. The safety device as in claim 3, characterized in that said at least one second input channel (36) comprises at least one second measurement unit (39) connected to said second processing unit (37) and second amplification means (38) configured to be connected to said power supply line (100) and to transmit at least one second intermediate voltage signal (IV') and at least one second intermediate voltage signal frequency (IF') to said second measurement unit (39), said second measurement unit (39) being configured to measure said at least one second intermediate voltage signal (IV') and said at least one second intermediate frequency signal (IF') and to transmit said at least one second work signal (W') to said second processing unit (37).

7. The safety device as in claim 6, characterized in that said second channel (36) further comprises a second frequency line (40), which is interposed between said second amplification means (38) and said second control unit measurement (39) and which comprises filtering circuits (42) of said second intermediate frequency signal (IF'), and a second voltage line (41), which is interposed between said second amplification means (38) and said second measurement unit (39) and which comprises attenuation circuits (46) of said second intermediate voltage signal (IV').

8. The safety method for monitoring an electric motor (100) by means of a safety device as in claim 6, characterized in that said preparation phase (S2) comprises a measurement sub-phase (S2.4) of said intermediate frequency signals (IF, IF') and said intermediate voltage signals (IV, IV') to obtain frequency information and voltage information, during which said first measurement unit (19) processes said second signal intermediate frequency (IF') and said second measurement unit (39) processes said first intermediate frequency signal (IF) to measure information on the direction of rotation of said electric motor (101), said first and second measurement units (19, 39) being configured to transmit said work signals (W, W') containing respective information on the direction of rotation to the respective processing units (17, 37).

9. The safety device as in claim 3, characterized in that said first and second processing units (17, 37) are connected to each other in a redundant manner.

10. The safety device as in claim 3, characterized in that said system also comprises a sensor input (60) connected to at least one of said first and second processing units (17, 37) and to a rotation sensor (61) configured to transmit a signal (@) correlated to the speed of said electric motor (101) to said at least one of said first and second processing units (17, 37).

11. The safety device as in claim 3, characterized in that said at least one first input channel (16) is connected to said second measurement unit (39) and said at least one second input channel (36) is connected to said first measurement unit (19).

12. The safety device as in claim 3, characterized in that said device comprises an insulating barrier interposed between said input channels (16, 36) and said processing units (17, 37).

13. The safety device as in claim 1, characterised in that said control unit (12) is contained in a single case (11).

14. A safety system for electric motors (101) comprising an electric motor (101), which is connected to a power supply line (100), and a safety device (10) as in claim 1, characterised in that said safety system further comprises a controller (105), which is connected to said switching means (15) and which is configured to:
receive said control signal (CF, CV),
control said electric motor (101) according to said control signal (CF, CV) so as to interrupt the power supply to said electric motor (101) in event of anomalies.

15. A safety method for monitoring an electric motor (101) by means of a safety device as in claim 1, characterized in that said method comprises at least the following phases:
a detection phase (S1), according to which said at least one first input channel (16) detects a voltage signal and a frequency signal present on said power supply line (100) of the electric motor (101);
a preparation phase (S2), according to which said at least one first input channel (16) processes said signals detected on said power supply line (100) and transmits said at least one first work signal (W) to said at least one first processing unit (17);
a processing phase (S3), according to which said at least one first processing unit (17) transmits an activation signal (AF, AV) to said switching means (15) according to said at least one first work signal (W) and compares voltage and frequency information of said at least one first work signal (W) with at least one predetermined frequency threshold (F) and with at least one predetermined voltage threshold (V).

* * * * *